United States Patent [19]

Olivieri

[11] Patent Number: 4,913,610

[45] Date of Patent: Apr. 3, 1990

[54] DEVICE FOR PREVENTING A WHEEL FROM SLIPPING OFF A SPINDLE ON WHICH IT IS MOUNTED IN A FREELY ROTATABLE MANNER

[75] Inventor: Oliviero Olivieri, Montebelluna, Italy

[73] Assignee: Icaro Olivieri & C. S.p.A. Minuterie Metalliche, Treviso, Italy

[21] Appl. No.: 363,817

[22] Filed: Jun. 9, 1989

[30] Foreign Application Priority Data

Jun. 15, 1988 [IT] Italy ................. 20969 A/88

[51] Int. Cl.[4] ...................... F16B 21/18; B60B 27/02; B60B 27/06
[52] U.S. Cl. .................................. 411/352; 411/348; 411/522; 24/573; 403/328; 301/120
[58] Field of Search ............... 411/352, 353, 347, 348, 411/351, 522; 403/328, 330; 24/573, 582, 583, 584, 706.6, 706.8; 301/120, 121

[56] References Cited

U.S. PATENT DOCUMENTS

| 2,009,371 | 7/1935 | Junge | 403/328 |
| 2,521,391 | 9/1950 | Meents | 403/328 |
| 2,901,804 | 9/1959 | Williams | 411/348 |
| 3,117,484 | 1/1964 | Myers | 411/348 |
| 4,610,058 | 9/1986 | Stemmildt et al. | 24/584 |

FOREIGN PATENT DOCUMENTS 472995 12/1914 France ................. 403/328

Primary Examiner—Neill R. Wilson
Attorney, Agent, or Firm—Sughrue, Mion, Zinn, Macpeak & Seas

[57] ABSTRACT

A retainer device is disclosed wherein two retainer plates engage from opposed sides an annular groove formed in an end section of a spindle on which a wheel, specifically a roller skate wheel, is mounted in a freely rotatable manner.

3 Claims, 1 Drawing Sheet

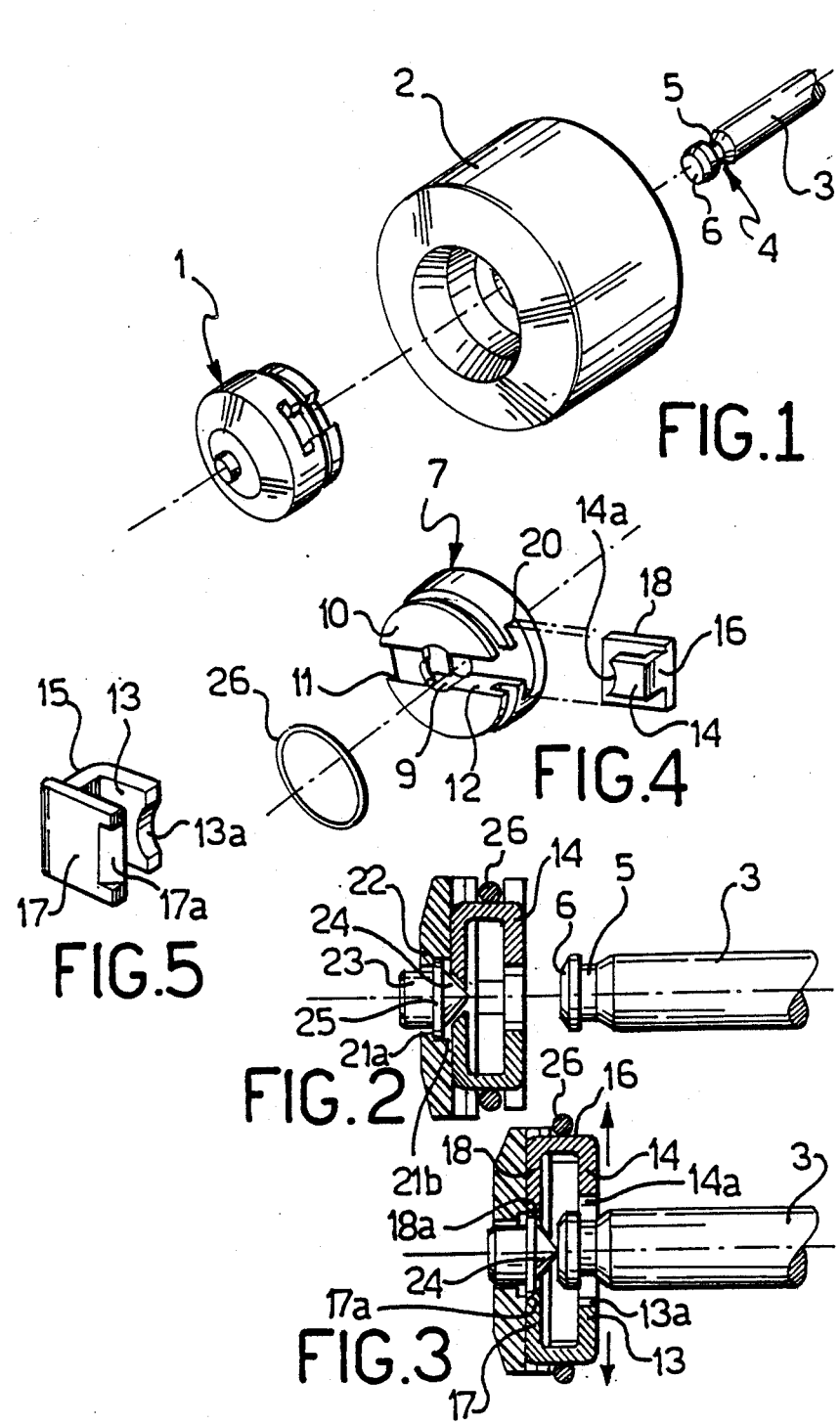

DEVICE FOR PREVENTING A WHEEL FROM SLIPPING OFF A SPINDLE ON WHICH IT IS MOUNTED IN A FREELY ROTATABLE MANNER

BACKGROUND OF THE INVENTION

This invention relates to a device for preventing a wheel from slipping off a spindle on which it is mounted in a freely rotatable manner, particularly but not exclusively intended for roller skates and the like.

In connection with roller skates and the like, for example, a basic requirement is that the wheels be prevented from slipping off their respective spindles, and this has been conventionally accomplished through the use of cotter pins, retainer rings, and the like arrangements effective to provide a suitable wheel retainer.

Such prior arrangements, while performing successfully as wheel retainers, have the disadvantage that they cannot be readily removed from a spindle on which they have been installed unless a specific tool in the hands of a skilled person is available. Accordingly, their use can make removal of a roller skate wheels, for instance, either for replacement or just maintenance purposes, a somewhat laborious operation, and above all, makes subsequent installation of the wheels problematic because such arrangements are liable to distort and become unusable if handled improperly.

The use of nuts threaded over a correspondingly threaded end portion of the spindle involves the availability of a suitable tool for their manipulation, and in addition, nuts may work loose in operation of the roller skates, or grow tighter on the spindles and freeze the wheels thereto, thus creating problems of a well-recognized seriousness.

To obviate such drawbacks, it has been recently proposed of using a retainer cap which is fitted over the free end of the spindle and has its sidewall surface formed with two or more longitudinal slots defining strips which can be spread elastically apart. A pair of diametrically opposed such strips are formed with respective teeth on the inside which are adapted to engage in corresponding notches provided at diametrically opposed locations on the end portion of the spindle. On fitting the retainer cap over the spindle end, engagement is achieved by a snap action. To remove such a retainer cap from the spindle, it is sufficient that the cap be moved angularly through a few degrees, such that the teeth are freed from their respective notches and made to ride on the solid spindle surface to spread the cap side strips elastically apart.

This prior retainer arrangement has the inherent advantage of being quick and practical to use both at its installation stage on the spindle and removal stage therefrom to replace a wheel, for example. However, it has the non-indifferent drawback that it cannot ensure a constant and effective retaining action for the wheel. In fact, in operation of the roller skates, by reason of the substantial physical contact between the cap and the wheel, it frequently happens that they freeze together, e.g. as a consequence of dust, mud, sand, and the like getting in between the cap and the wheel, which results in the cap being dragged around and disengaged from the spindle notches. When such disengagement occurs, the wheel is let free to slip off.

Another drawback originates from the retainer cap being liable to plastic deformation, especially at the spreadable longitudinal strips thereof, such that the strips can no longer perform their function of elastic engagement in the spindle notches.

SUMMARY OF THE INVENTION

It is a primary object of this invention to provide a retainer device as indicated, which has such structural and performance characteristics as to overcome all of the above-noted drawbacks with which the prior art is beset.

This and other objects to become apparent from the ensuing description, are achieved by a device for preventing a wheel from slipping off a spindle on which it is mounted in a freely rotatable manner, said spindle having an end portion formed with an annular groove in the vicinity of the spindle free end, characterized in that it comprises:

a body wherein a cavity is defined for access from outside the body through a circular entrance to receive said spindle end portion thereinto;

at least two co-planar, juxtaposed retainer plates fitting for sliding movement in guides formed on said body and extending in a radial direction to said entrance, said plates being movable in said cavity from a working position where they lie close together to engage in said annular groove to a rest position where they are held apart to disengage from said groove; and a spreader member operable substantially as a pushbutton to drive, against the bias of a spring means, said retainer plates to the rest position, which spreader member is carried slidably in said body and movable in an axial direction relatively to the entrance of said cavity.

BRIEF DESCRIPTION OF THE DRAWINGS

The features and advantages of a device according to the invention will be more clearly understood by having reference to the following detailed description of an embodiment thereof, to be taken by way of illustration and not of limitation in conjunction with the accompanying drawings, where:

FIG. 1 is an exploded perspective view of a roller skate wheel, its respective spindle intended to accommodate the wheel rotatably thereon, and a device according to the invention;

FIGS. 2 and 3 are sectional views of the same device as in FIG. 1, shown under two different conditions of use thereof;

FIG. 4 is an exploded perspective view of the same device as shown in the preceding figures; and FIG. 5 is an enlarged scale perspective view of a detail of the device shown in FIG. 4.

DETAILED DESCRIPTION OF THE INVENTION

With reference to the drawing views, the numeral 1 generally designates a device according to the invention for preventing a wheel 2 from slipping off a spindle 3 on which it is mounted in a freely rotatable manner, said spindle 3 having an end portion 4 formed with an annular groove 5 located at a predetermined distance from the bevelled free end 6 of said spindle.

The device 1 of this invention comprises a body 7, essentially configured as a flattened cylindrical button, in which a cavity 8 is defined which is accessible from outside said body 7 through a circular entrance 9, formed centrally through a flat face 10 of said body 7. The cavity 8 is suitably dimensioned to accommodate the end portion 4 of the spindle 3 over which the inventive device 1 is adapted to fit in a manner to be explained.

At said flat face 10, there are formed in the body 7 two juxtaposed guides 11, 12 which extend radially to the circular entrance 9. Two retainer plates 13 and 14 are mounted slidably in these guides 11 and 12, respectively, which when positioned in said guides will lie co-planar with and juxtaposed to each other. The mutually confronting sides of said retainer plates 13, 14 are conventionally provided with respective semicircular cutouts 13a, 14a having substantially the same diameter dimension as the groove 5 on the end portion 4 of the spindle 3.

The retainer plates 13 and 14 are movable from a working position (FIG. 2), where they lie close together to engage the above-noted groove 5 in a manner to be explained, to a rest position (FIG. 3), where they are held apart to disengage from said annular groove.

In a preferred embodiment, each of said retainer plates 13, 14 constitutes a leg of a substantially U-shaped member 15, 16, the other leg 17, 18 whereof fits slidably in respective guides 19, 20 formed in the body 7 of said device 1 and extending parallel to the slideways 11, 12 for the retainer plates 13, 14 being discussed.

The cavity 8 in said body 7 is accessible from outside the body through a hole 21 formed axially through said body and open on the remote face 22 thereof from that formed with said circular entrance 9. The hole 21 is defined by two successive sections 21a, 21b having different diameters, between which an annular shoulder 22 is formed.

The hole 21 accommodates a cylindrical pushbutton 23 in a guided slidable fashion therein which has its end 24 adjacent to the inside of the cavity 8 conical in shape. This conical end 24 is adapted to engage with bevels 17a, 18a provided on the free opposed sides of the above-noted legs 17 and 18.

The pushbutton 23 has, at an intermediate location thereon, an annular rim 25 whose outside diameter is substantially equal to the inside diameter of the annular shoulder 22 against which it is intended to abut.

A spring ring 26 engages with the exteriors of the U-shaped members 15, 16 and fits into an annular groove 27 formed in the body 7 at an intermediate location to the guide pairs 11, 12 and 19, 20.

Under a rest or non-operative condition of the device according to the invention, the U-shaped members 15, 16 thereof would lie close together and held in these positions by the spring ring 26.

To have the device 1 perform its function of preventing the wheel 3 from slipping off, it is fitted over the end portion 4 of the spindle 5, the movement being advantageously facilitated by the bevelled free end 6 of the latter. In fact, as the retainer plates 13, 14, and hence the U-shaped members 15, 16, are pushed against the bevel on this free end 6, they are concurrently spread open against the bias of the spring 25 which, immediately thereafter, will cause the retainer plates to snap into the annular groove 5 and become engaged.

In this position, the wheel 3 is prevented from slipping off the spindle 4, and this retaining action can only be removed deliberately.

To release, it will be merely necessary to push in the pushbutton 23, thereby the conical end 24 of the latter engages with the ramp-like bevels 17a, 18a on the U-shaped members 16, 16 forcing them apart.

As a result of the above operation, the retainer plates 13, 14 will be concurrently moved away from each other, out of their working engagement in the groove 5 to their rest positions where they are disengaged from said groove. By suitably dimensioning the depth of the chamber 8 and "stroke" length of the pushbutton 23 inside said chamber—thereby on depressing the pushbutton, the tip of its conical portion 4 contacts the spindle free end 6—the same operation whereby the retainer plates 13, 14 are spread apart also causes the device to slide off said spindle.

Advantageously, the cylindrical button-like body of the device according to the invention should be sized and shaped to practically constitute a hub cover for the wheel 6, where this is of the type shown in FIG. 1.

The invention disclosed herein above is susceptible to many alterations and modifications within the invention scope. Thus, as an example, the device could comprise three retainer plates, arranged co-planarly at 120° from each other, or even four or more such plates, subject to their being arranged to symmetrically encircle the annular groove in which they are to be engaged.

What is claimed is:

1. A device for preventing a wheel from slipping off a spindle on which it is mounted in a freely rotatable manner, said spindle having an end portion formed with an annular groove in the vicinity of the spindle free end, said device being particularly intended for use on roller skates, characterized in that it comprises:

a body wherein a cavity is defined for access from outside the body through a circular entrance to receive said spindle end portion thereinto:

at least two co-planar, juxtaposed retainer plates fitting for sliding movement in guides formed on said body and extending in a radial direction to said entrace, said plates being movable in said cavity from a working position where they lie close together to engage in said annular groove to a rest position where they are held apart to disengage from said groove; and a spreader member operable substantially as a pushbutton, to drive, against the bias of a spring means, said retainer plates to the rest position, which spreader member is carried slidably in said body and movable in an axial direction relatively to the entrance of said cavity, wherein said retainer plates are comprised of a leg of respective U-shaped members the other leg of said U-shaped members being fitted for sliding movement in respective guides formed in said body in parallelism with the slideway guides for said retainer plates, said spring means being arranged to act on said U-shaped members and hold them in said working position.

2. A device according to claim 1, characterized in that said spreader member has a conical end facing the interior of said cavity and engaging with suitable ramp-like bevels formed on opposed sides of the legs of said U-shaped members.

3. A device according to claim 1, characterized in that said body is configured essentially as a flattened cylindrical button.

* * * * *